Oct. 13, 1942.  A. C. SKOOGLUND  2,298,846
WAX-POLYMER BLEND MANUFACTURE
Filed Nov. 2, 1940
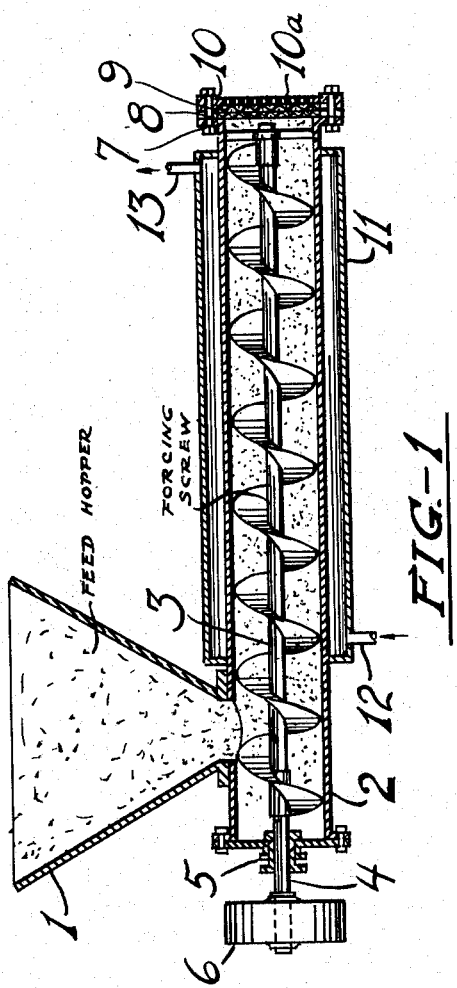
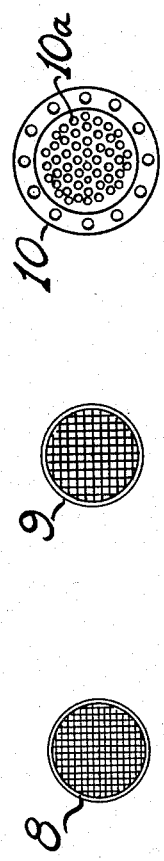
Arthur C. Skooglund Inventor
By  J. L. Small  Attorney Patented Oct. 13, 1942

2,298,846

UNITED STATES PATENT OFFICE 2,298,846

WAX-POLYMER BLEND MANUFACTURE

Arthur C. Skooglund, Clark Township, Union County, N. J., assignor, by mesne assignments to Jasco, Incorporated, a corporation of Louisiana Application November 2, 1940, Serial No. 364,045

5 Claims. (Cl. 18—48)

This invention relates to improved plastic blends of waxes with high molecular weight polymeric hydrocarbons, and to the process for making such blends.

Broadly, to improve the mixing of a wax with a high molecular weight rubbery polymeric substance to form a homogeneous plastic blend of these materials, they are forced together under high compression into very slender pieces, the dispersion of the materials in the blend by this procedure being carried out at sufficiently low temperatures and with a sufficiently restricted amount of attrition to preserve the polymers from molecular disintegration.

Plastic homogeneous mixtures of waxes with polymeric hydrocarbons, particularly with stable branched linear polymers, such as polybutenes, have been recommended for many commercial uses. An enumeration of only a few of these important uses includes candles, various other molded articles, water-proof coating compositions for textiles and papers, bonding adhesive for laminated sheet materials, protective coatings for metals and food stuffs, impregnating compositions for leather, masonry, and other porous solid materials, and in gas- and waterproof self-sustaining sheets, envelopes, or cartons useful for wrapping.

In substantially all of these uses, the wax-polymer composition is of most advantageous quality when its ingredients are blended homogeneously and the molecular weight of the polymer ingredient is preserved to the greatest degree against breakdown. Methods heretofore proposed for accomplishing the mixing of the ingredients, excepting those in which a low temperature solvent solution is employed, have required vigorous mechanical mixing and attrition at elevated temperatures, essentially above the melting point of the wax, and under these conditions, breakdown of the polymer is greatly favored. The mechanical mixing means indicated for these methods are of the type known as mixers and kneaders, exemplified by apparatus known as Werner-Pfleiderer and Banbury mixers.

With the drastic mechanical action of the mentioned mixing apparatus, it is necessary, nevertheless, to use the wax in a molten condition and at elevated temperatures. Even then, considerable difficulty is encountered in making a homogeneous blend, because the polymers in this procedure break into lumps which cannot be successfully broken up after their formation, and as a result the mixture remains non-homogeneous. In the drastic types of mixing, the polymer is subjected to both mechanical and heat breakdown resulting in a mixture of inferior quality. While greater homogeneity may be obtained with less breakdown of the polymer by having the polymer absorb the wax in a volatile solvent solution, this method is frequently inconvenient on account of the problem of removing and recovering the solvent.

An object of the present invention is to accomplish a homogeneous mixing and blending of the waxes with the polymer ingredients incurring a minimum of breakdown by thermal depolymerization or mechanical attrition. A further object is to provide a process of blending which can be carried out more expeditiously and effectively. Further specific objects are to provide a process of mixing which is effective at relatively low temperatures, at which the wax ingredient in normally solid or plastic.

Further advantages and objects will be understood from the following description and the drawing which will explain the invention in more detail.

In general, the waxy ingredient to be used is a normally solid aliphatic compound having a melting point in the range of about 90° F. to 200° F. This type of compound more specifically includes substances, such as crystalline paraffin wax, amorphous paraffinic waxes, e. g., petrolatum, high melting point waxes like carnauba wax, and various other waxes of synthetic, mineral, vegetable and animal origin, e. g., montan wax, beeswax, candellila wax, etc.

The preferred type of polymeric hydrocarbon ingredients are linear and branched chain compounds of sufficiently high molecular weight to make the substances have the form of a plastic semi-solid to solid or rubbery consistency and form. The high molecular weight polymers of iso-olefins, more particularly those of isobutene, known as polybutenes, are representative and preferred examples of these polymers. The polybutenes are highly susceptible to breakdown by mechanical attrition and heat depolymerization, but, on the other hand, have very desirable properties which they confer upon their blends with waxes. They are capable of forming blends light in color, colorless, translucent, odorless, tasteless, harmless, physiologically flexible, resistant to oxidation and various other chemical actions, and extremely durable.

For the most valuable uses of the blends, the linear polymer should have a molecular weight above 15,000, and preferably above 30,000. Also, the polymer should be highly saturated with respect to hydrogen. Ideally, the polymer should contain no substantial number of unsaturated double bonds, and the polymers of mono-olefins approach very closely to this in having on an average no more than about 1 double bond per molecule. However, a hydrogenated linear diolefinic polymer, or a copolymerized product in which less than 1 double bond is present in a chain of about 100 to 200 carbon atoms, is fairly well adapted for making the chemically stable blends. Included in the class of mono-olefin polymers are the various polyalkenes, such as polyethene, polybutenes, and polypentenes, the branched linear polymers, such as those obtained by the polymerization of isobutene, being of special value on account of their high molecular weights and excellent solubility characteristics. Analogous linear polymers are obtained by hydrogenating rubber or the unsaturated polymers of diolefins, but these, in general, lack the very high degree of saturation and high molecular weights which are preferred.

The various linear polymers of a highly stable character are also valuably used together with unsaturated polymeric materials, such as natural and synthetic rubbers, in that the linear saturated polymers are capable of plasticizing and increasing the stability of the more unsaturated rubbery materials.

In the practice of this invention the selected waxes and polymer ingredients are admixed in various proportions, depending upon the desired use of the blended composition which is to be obtained, and the proportions of these ingredients may vary to a great extent. For example, in compositions to be used in making moulded articles, sheets, or tough coating films, frequently the polymer ingredient is in minor proportions to the wax, whereas, for impregnating and highly flexible coatings the polymer is preferably the major ingredient.

Having determined the desired proportions of the ingredients, the wax and polymer are brought together and thoroughly dispersed one within the other by being forced under high compression through small orifices or openings, e. g., meshes of a fine screen, while the compressed mixture is maintained at a suitable temperature, i. e., sufficiently low to maintain the mixture in a substantially solid or plastic form and prevent excessive depolymerization.

A specific embodiment of the invention will be used as an illustration with reference to a pressure extruding strainer apparatus, a view of which will be described with the accompanying drawing.

In Figure 1 of the drawing is diagrammatically shown in elevation a cross-sectional view of an extruding strainer apparatus of a suitable type used for accomplishing the homogeneous mixing of the waxes and polymer ingredients. Figure 2 shows a face view of a small wire fine screen disposed at the discharge end of the apparatus, the mesh being magnified. Figure 3 shows a face view of a reinforcing screen which is disposed in the apparatus continuous to the fine screen. Figure 4 is an end view of the apparatus showing a perforated plate that reinforces the screens.

Referring to the drawing, the character 1 indicates a feed hopper for the ingredients to be blended. The hopper feeds into a cylindrical barrel 2 in which is disposed a helical conveyor or forcing screw 3, projecting outside the barrel in the form of a protruding shaft 4. The shaft passes through a bearing gland 5 in passing from the interior of the barrel to the outside, and on the extension of the shaft outside the barrel is attached a power drive transmitting means in the form of a pulley 6 which, upon being revolved, turns the screw within the barrel in a manner to compress and force the mixed solid material toward the barrel outlet, which is at the end opposite from the feed inlet.

The outlet end of the barrel has a flange 7 against which is bolted in consecutive order, a fine screen 8, an adjacent heavier screen 9, followed by a head plate 10 which is perforated with relatively large-sized holes 10a.

The barrel is surrounded by a jacket 11 with inlets and outlets 12 and 13, respectively for conducting through the jacket a liquid medium of controlled temperature whereby the temperature within the barrel is regulated through heat exchange.

The fine screen 8, which precedes the reinforcing screen 9 and the head plate 10, preferably has very small openings of the order of from 40 to 200 mesh, and it is primarily the means which creates the resistance for the degree of compression desired and acts to shear the compressed mixture to the desired degree as it is being extruded. The reinforcing screen 9 is relatively much heavier and stronger than screen 8 and functions mainly as a back support of the finer screen, similarly, the head plate 10 reinforces the heavier screen 9 and permits the blended mixture to be expelled from the apparatus, through holes 10a.

It will be understood that many of the parts, also, the proportions, shapes, and relative positions of the apparatus parts shown for the purpose of illustration can be modified without essentially changing the operation. For example, in place of a pulley for transmitting motion to the screw, a gear arrangement (not shown) may be used. Also, more of a piston-like pressing means may be used in place of the screw, and in place of the screens various forms of perforated disks or plates may be used. The screw forcing means may be designed to give some degree of plasticizing to the mixture without fluidizing the material.

Furthermore, the type of apparatus which has been described can be readily modified to suit the needs of any particular procedure for blending. Various conveyor means (not shown) can be attached to the apparatus for continuous charging of initial materials, removal of the extruded products, and recycling of the extruded products. Or, the apparatus can be used in a series with other performing in a similar manner so that the mixing is accomplished in a series of stages.

Using the described extruder type strainer equipment equipped with a medium meshed screen at the discharge end, equal quantities of a paraffin wax having a melting point of 130° F. and of polybutenes having an average molecular weight of 60,000 were fed through the hopper and forced under compression through said screen, and a resulting extruded mixture was found to be satisfactorily uniform and homogeneous, not needing any straining to separate lumps. The solid mixture contents of the barrel during this operation were kept at a temperature of approximately 120° F.

For comparison, the same ingredients and the same proportions as in the previous experiment were mixed using a Werner-Pfleiderer kneader to carry out this mixing. To obtain the same degree of blending as in the previous experiment, extreme care was exercised in the addition of the molten wax to the polymer and the kneader was operated for a sufficient length of time necessary to obtain a homogeneous blend.

A number of experiments as outlined above were carried out using all precautions possible to make the results comparable, and the blended products obtained by the different procedures were analyzed to determine the extent to which the molecular weight of the polymers was affected, also to determine in what way the qualities of the blends varied.

Operating with the kneader and using a temperature above the melting point of the wax for as short a period of time and with as low a temperature as permissible to obtain a uniform blend, the kneader was charged with 100 pounds of polybutenes having an average molecular weight of 100,000 and 100 pounds of paraffinic wax (M. P. 130° F.), and run for 4 hours with the temperature kept always below 250° F. At the end of this operation the average molecular weight of the polybutenes, which had been treated, was determined and was found to have decreased to as low as between 50,000 and 60,000.

Operating with the extruding type strainer equipped with an 80 mesh screen, as the finest screen, on the same quantities of 100,000 molecular weight polybutenes and the wax, and passing the material through the apparatus 3 times with the temperature maintained at 120° F., it was found that the polybutene in the final product given better homogeneity than the product of the kneader operation had its molecular weight lowered to only about 95,000. This operation was accomplished in only 15 minutes. On a single pass through the extruding strainer the molecular weight of the polybutene treated was not appreciably lowered.

The improvement in the product obtained according to the present invention not only shows up in the very much more limited decomposition of the polymer, but also in the higher bond strength and viscosities of the wax-polymer blends, both of these qualities being essentially affected by the molecular weight of the polymer.

The type of extruding screen and the fineness to which the extruded mixture is to be sheared for obtaining the dispersion of the ingredients depends upon the exact nature of the waxy materials and the polymers to be blended, for the dispersing action will be favored by the softening of the wax and lowering of the molecular weight of the polymer, and thus the dispersion will be promoted also by raising the temperature during the mixing. Accordingly, with lower melting point waxes, or with lower molecular weight polymers, the processing can be expedited, and a finer screen may be employed with less harmful effects on the qualities of the resulting blend.

In general, for mixing waxes having melting points at least of the order of paraffin waxes, i. e., at least about 110° F., with polymers having high molecular weights of the order of 30,000 to 200,000 or higher, it is preferred to use screens from about 40 to 100 mesh (that is with from 40 to 100 openings per inch), so that the solid pieces being extruded have a thickness of less than about 0.02 of an inch. The temperature is preferably kept as low as permissible for obtaining a homogeneous blend, but to expedite the mixing, it may be carried out at temperatures ranging from 5 to 20 degrees below the normal melting point of the waxes. Advantageous features of this invention, however, are adaptable even when the mixture is treated at temperatures somewhat above the melting point of the wax, for the period of mixing is greatly decreased.

The procedure is well adapted for continuous operations with excellent protection against the formation of lumps and can be carried out with better control and moderation of the temperature than other methods of mixing. It should be appreciated that the reduction in the time of mixing is an important factor in avoiding decomposition, just as reduction in temperature, for at any temperature at which depolymerization can occur, by reducing the time at which the polymer is exposed to the depolymerizing temperature, the extent of depolymerization is also lowered.

The mechanism by which the homogeneous dispersion of the ingredients is accomplished in accordance with the present invention is believed to be too complex to be understood from a simple physical picture. However, it appears that the pressure exerted on the ingredients in the mixed mass within the extruder tends to force individual molecules of the polymer between the molecules of the waxes, and this dispersing action proceeds on a microscopic scale when the masses of the ingredients are compressed and extruded into the finely divided solid granules having the form of very slender rods forced through minute openings of the fine screen. The extruder may be considered as shearing the solid mixture lengthwise along the axis of the linear polymers, in contrast to a cutting action across the polymer axis, or against the grain, so to speak, which is effected in the ordinary types of mixing apparatus.

While there is some appreciable amount of breakdown in the polymer through the extruding action when the mixture is thus sheared, this amount of breakdown is considerably less than that resulting from the drastic mechanical attrition to which the polymers are subjected in the usual types of mixing apparatus, which operate on the principle of grinding the polymer into sufficiently small pieces so that the polymer can go into solution into the surrounding molten wax.

The polymer and wax blend may contain small amounts of stabilizing agents which act to inhibit breakdown of the polymer. They may also contain compatible resins, reinforcing agents, plasticizers, or other compounding materials known to be useful in such blends.

The present invention is not to be limited to any theory on the mechanism of the blending operation, nor to any particular example or embodiment which has been given for the purposes of illustrations. Various modifications come within the spirit of the invention, as defined in the appended claims.

I claim:

1. A process of homogeneously blending a wax with a linear high molecular weight hydrocarbon polymer susceptible to depolymerization and breakdown by heat and mechanical attrition, which comprises admixing the wax and the polymer to form a heterogeneous mixture thereof, compressing said admixed materials under a substantial pressure at a temperature sufficiently low to prevent substantial depolymerization of the polymer, and forcing the compressed materials to become sheared into slender solid pieces wherein said wax and polymer are blended.

2. In the production of homogeneously blended plastic compositions of wax and high molecular weight linear hydrocarbon polymers the steps comprising forming a heterogeneous mixture of the wax and polymer, and extruding said mixture under high compression into homogeneous solid pieces having extremely small cross sectional areas.

3. The process of forming homogeneous plastic blends of semi-solid to solid waxes with iso-olefin polymers having molecular weights above 30,000, which comprises commingling a mass of semi-solid to solid wax with a mass of said polymers, and extruding a solid merged mass of the wax and the polymers from said commingled masses at a temperature below the melting point of the wax through narrow openings in a fine screen ranging from 40 to 200 mesh.

4. The process of homogeneously blending wax with polybutenes which comprises compressing a mass of normally solid wax containing a heterogeneously admixed high molecular weight polybutene, compressing said mass and shearing the compressed mass by extrusion into slender pieces of solid form having a thickness of less than about 0.02 of an inch, said mass undergoing extrusion being maintained at a temperature sufficiently low to prevent substantial heat depolymerization of the polybutene.

5. Process as described in claim 4, in which said mass undergoing compression and extrusion is maintained at a temperature below the normal melting point of the wax.

ARTHUR C. SKOOGLUND.